United States Patent [19]

Kotani et al.

[11] Patent Number: 5,265,152
[45] Date of Patent: Nov. 23, 1993

[54] FACSIMILE APPARATUS

[75] Inventors: Matahira Kotani, Ikoma; Motohiko Hayashi, Yamato-Koriyama; Ryoichi Kawai, Kita-Katsuragi; Katsuyuki Sakai, Nara; Kenichi Shiraishi; Shigeru Kida, both of Yamato-Koriyama, all of Japan

[73] Assignee: Sharp Kabushiki Kaisha, Osaka, Japan

[21] Appl. No.: 750,058

[22] Filed: Aug. 27, 1991

[30] Foreign Application Priority Data

Sep. 3, 1990 [JP] Japan ............... 2-233607
Sep. 3, 1990 [JP] Japan ............... 2-233608
Sep. 3, 1990 [JP] Japan ............... 2-233609
Sep. 3, 1990 [JP] Japan ............... 2-233610

[51] Int. Cl.$^5$ ............... H04N 1/00; H04N 1/04; H04N 1/23
[52] U.S. Cl. ............... 379/100; 358/400; 358/401; 358/471; 358/474; 358/494; 358/496; 358/498
[58] Field of Search ............... 379/100; 358/400, 401, 358/448, 442, 472, 474, 471, 488, 496, 497, 498

[56] References Cited

U.S. PATENT DOCUMENTS

| | | | |
|---|---|---|---|
| 3,914,538 | 10/1975 | Perreault et al. | 358/435 |
| 4,809,080 | 2/1989 | Kotani et al. | 358/472 |
| 4,833,547 | 5/1989 | Mase | 358/400 |
| 4,895,288 | 1/1990 | Kotani et al. | 75/226 |
| 5,040,206 | 8/1991 | Tokumasu et al. | 379/100 |
| 5,072,307 | 12/1991 | Shirakoshi et al. | 358/496 |

FOREIGN PATENT DOCUMENTS 57-160259 10/1982 Japan .
0369299 5/1990 Japan .

OTHER PUBLICATIONS

Patent Abstracts of Japan vol. 7, No. 99 (E-172)(1244) Apr. 27, 1983 & JP-A-58 020 059 (Ricoh).
Patent Abstracts of Japan–(corresponding to reference 1) 57-160259. Oct. 1982.

*Primary Examiner*—Jin F. Ng
*Assistant Examiner*—Stella L. Woo
*Attorney, Agent, or Firm*—Nixon & Vanderhye

[57] ABSTRACT

A facsimile apparatus having a housing (10) for the apparatus and a telephone placing portion (12) disposed at an upper part of the housing, on which a telephone (11) connected to a public telephone network can be placed. The facsimile apparatus further including elements (18) for scanning an original by feeding the original to generate electrical signals representing image information of the original and elements (19) for recording image information applied to the apparatus through the public telephone network on a sheet. Both the scanning elements and the recording elements are disposed side by side along the direction of feeding of the original. The telephone placing portion is disposed above both the scanning elements and the recording elements to cover the upper portion of both the scanning elements and the recording elements. The apparatus further includes a first passage (32) disposed between the telephone placing portion and the scanning elements for feeding the original and second passage (33) disposed between the telephone placing portion and the recording elements, for feeding the original passed through the first passage. Both the first passage and the second passage can be opened to the outside by opening the placing portion.

14 Claims, 2 Drawing Sheets

FACSIMILE APPARATUS

BACKGROUND OF THE INVENTION

1. Field of the Invention

The present invention relates to a facsimile apparatus using a public telephone network, and in particular, to a facsimile apparatus with a telephone base.

2. Description of the Related Art

In facsimile apparatuses hitherto in use for transmitting and receiving electrical signals representing image information through a public telephone network, a telephone connected to the public telephone network and a facsimile apparatus are placed side by side on a desk or the like, or a telephone and a facsimile are placed separately on the upper part and the lower part of a rack or the like in order to put a space to a good use.

In the former it is necessary to ensure a space for the telephone in addition to a space for the facsimile apparatus, therefore such former apparatus is not preferable with a viewpoint of space efficiency. In the latter it is necessary to provide a rack or the like in order to accommodate and arrange vertically these telephone and facsimile apparatus, therefore there is such a problem that a cost required for installing the facsimile apparatus and the telephone becomes expensive.

In Japanese Patent Laid-Open Publications No. 57 (1982)-160259 and Japanese Utility Model Publications No. 58 (1983)-61571, a facsmilie apparatus, which is provided with both a telephone placing portion for installing a telephone and a original placing portion for installing an original, for example manuscript, map, a photograph, or other fixed graphic material etc, is disclosed. However, the telephone placing portion is disposed alongside the original placing portion having nearly the same plane size as the telephone placing portion, so that the facsimile apparatus is incapable of having a small plane size and in comparison with the usual case in which a telephone and a facsimile apparatus are placed separately side by side no improvement is performed from a viewpoint of space efficiency.

In Japanese Utility Model Publications No. 58 (1983)-19561 a facsimile apparatus with a telephone base which doubles as a protecting cover of the facsimile apparatus is disclosed. The telephone base constitutes an upper side surface of a housing of the facsimile apparatus so as to reduce the plane size of the apparatus. While this disclosure avoids the above-mentioned problem, a detailed construction, to reduce the thickness of the housing of the facsimile apparatus, is not shown or provided.

SUMMARY OF THE INVENTION

It is therefore an object of the present invention to provide a facsimile apparatus having a telephone placing portion serving as a telephone base which is capable of installing a telephone and having a small thickness and a compact size.

A facsimile apparatus according to the present invention includes a housing of the apparatus and a telephone placing portion disposed at an upper part of the housing, on which a telephone connected to public telephone network can be placed. The facsimile apparatus includes means for scanning an original by feeding the original to generate electrical signals representing image information of the original and means for recording image information applied to the apparatus via the telephone on a sheet. The scanning means and the recording means are disposed side by side along the direction of feeding of the original.

Thereby the facsimile apparatus according to the invention is capable of having a small thickness and a compact size. The telephone placing portion is capable of being opened and kept in a closed position during the operation of the apparatus. The telephone placing portion may constitute an upper side plate of the housing, having a plane surface. The telephone placing portion may be disposed above both the scanning means and the recording means to cover the upper portion of both the scanning means and the recording means.

In a preferred embodiment, the scanning means includes a light source for illuminating an original, an optical system for guiding the light reflected from the original, and a CCD line sensor for sensing the light. The recording means may include a platen roller for feeding the sheet on which image information is recorded and a thermal recording head supported by the platen roller.

The telephone placing portion may include a guide portion for guiding an original inserted into the apparatus and further include first passage between the telephone placing portion and the scanning means and second passage disposed between the telephone placing portion and the recording means. The original is fed through the first and second passage. Both first passage and second passage can be opened to the outside by opening the telephone placing portion.

In a preferred embodiment, the telephone placing portion includes a start/copy switch for starting the operation of the scanning means and a stop switch for stopping the operation of the scanning means and the recording means.

Furthermore, there is provided with a cassette having recording paper at a rearward side portion of the housing and the housing includes a outlet opening commonly used for putting out recording sheet from the recording means and the original from the scanning means. Thus the thickness of the facsimile apparatus can be kept thin and the apparatus can be constructed to have a plane configuration.

In a preferred embodiment the recording means is also capable of recording the image information from said scanning means on a sheet.

Advantages of the above-mentioned apparatus are such that the telephone and the facsimile apparatus can be installed with good space efficiency, and the apparatus having a small thickness and a compact size can be designed and provided.

Further objects and advantages of the present invention will be apparent from the following description of the preferred embodiments of the invention as illustrated in the accompanying drawings.

DESCRIPTION OF THE PREFERRED EMBODIMENTS

An embodiment of a facsimile apparatus according to the present invention will be described in detail hereinafter with reference to the accompanying drawings.

Figure 1:
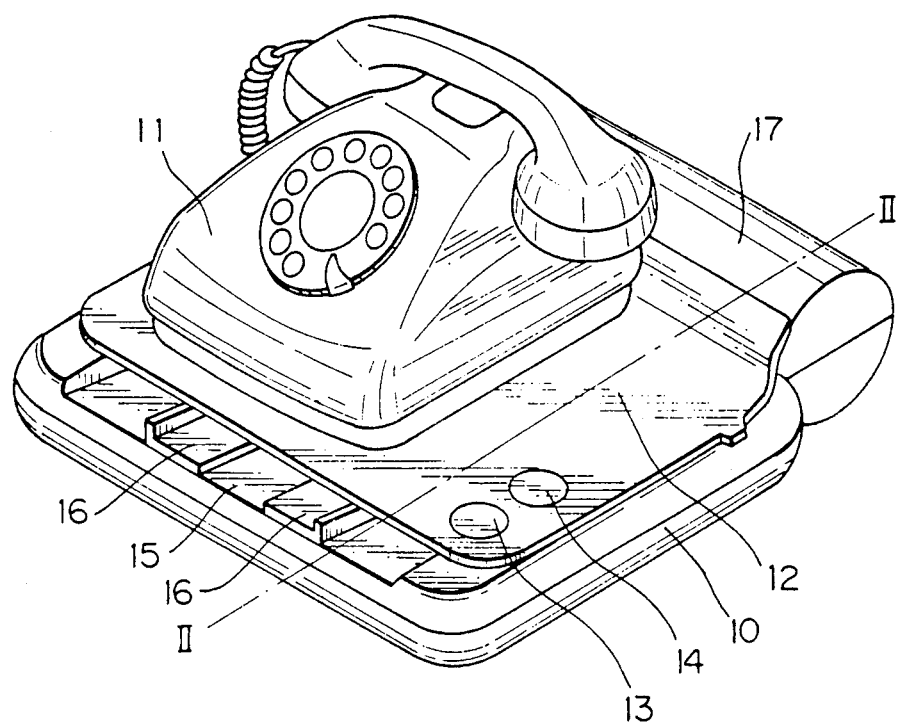
FIG. 1 shows a perspective view of a facsimile apparatus with a telephone according to the present invention.

FIG. 1 shows a perspective view of an facsimile apparatus. A telephone 11 can be placed on a telephone placing portion 12 as shown in FIG. 1. The telephone placing portion 12 constitutes an upper side plate of a housing 10 of the facsimile apparatus and it can be opened from its closing position to its opening position. Thus the telephone placing portion 12 serves also as the ceiling portion of the housing 10 of the facsimile apparatus. The telephone placing portion 12 has sufficient size to cover almost all of the whole upper portion of the facsimile apparatus.

A start/copy switch 13 and a stop switch 14, for operating the facsimile apparatus, is provided at an upper surface of the telephone placing portion 12. The start/copy switch serves for starting the operation of a scanning means or starting copying operation and a stop switch serves for stopping the operation of scanning and recording (not shown in this figure).

At the front face of the facsimile apparatus and under the telephone placing portion 12, there is provided an inserting portion 15 into which original sheets are inserted. These original sheets are manuscript, a photograph, map, or subject copy etc, having image information to be transmitted to another facsimile apparatus by the facsimile apparatus. This inserting portion 15 is provided with a pair of guides 16 for guiding original sheets to an inside of the facsimile apparatus. A width between the guides 16 can be adjusted according to a width of original sheets. Furthermore, the facsimile apparatus is provided with a cassette 17 for installing recording paper in roll type at a rearward side portion of the facsimile apparatus.

Figure 2:
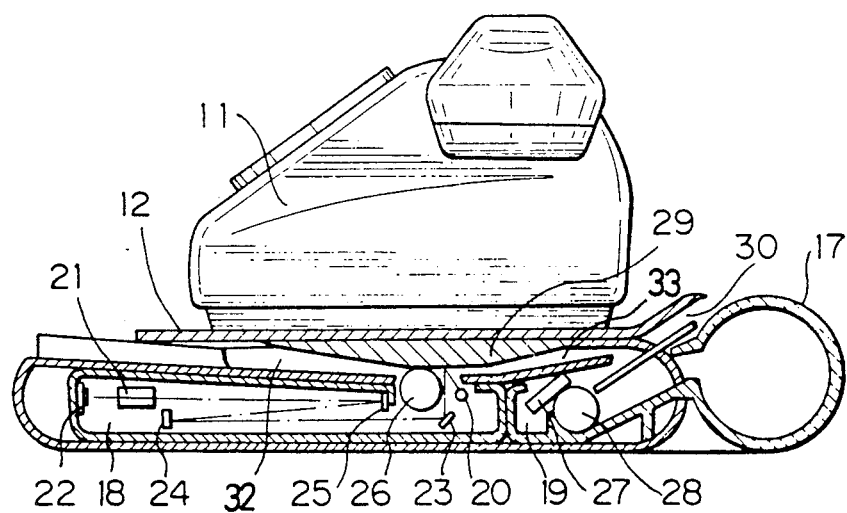
FIG. 2 shows a cross sectional view showing a cross section taken along II—II in FIG. 1.

FIG. 2 is a cross sectional view showing a cross section taken along line II—II in FIG. 1. The facsimile apparatus is provided with a scanning means 18 for feeding original sheets to generate electrical signals representing the image of the original sheets, and a recording means 19 for recording information content of received signals from another facsimile apparatus through the telephone and recording copies of original sheets.

Furthermore, the facsimile apparatus includes a means for transmitting a electrical signal converted from the image of original sheets through the public telephone network (not shown in this figure).

The scanning means 18 is composed of a light source 20 for lightening a small area on a original sheet, reflection mirrors 23 to 25 for introducing light reflected from the area into a CCD line sensor 22 through a lens 21, and a roller 26 for feeding an inserted sheet during the scanning. A line-shape light source such a fluorescent light lamp is used for the light source 20. The reflected light from the small area is focused on the surface of the CCD 22 by the lens 21. The sheet is scanned and the image information is converted into a electrical signal by means of the CCD 22 for transmission by wire to a facsimile receiver.

The recording means 19 is composed of a thermal recording head 27 for recording information content of received signals from another facsimile apparatus, and a platen roller 28 for feeding recording paper from the cassette 17 to outside the facsimile (not shown in the figure). In addition the platen roller 28 supports the thermal recording head 27.

In a preferred embodiment, the facsimile apparatus is provided with a function for copying an original. The function is performed with use of the scanning means 18 and the recording means 19. In other words the copy of the original is recorded by the recording means with the image information from the scanning means on a sheet.

Both the scanning means 18 and the recording means 19 are constructed in such a manner that they have as small a thickness as possible, and they are attached side by side along the direction of feeding of original sheets. As shown in FIG. 2, the direction of scanning by the scanning means 18 is almost parallel with the direction of feeding of recording paper. Thereby the facsimile apparatus 10 can have a very small thickness and a generally plane configuration. Therefore, the telephone 12 is placed stably on the telephone placing portion 11.

As shown in FIG. 2, a guide portion 29 is formed at the back surface of the telephone placing portion 12 so that original sheets are conveyed above an upper part of the scanning means 18 and the recording means 19. The guide portion 29 abuts against the roller 26. Furthermore, there is provided with first passage 32 between the guide portion 29 and the scanning means 18 and second passage 33 between the guide portion 29 and the recording means 19. Original sheets pass through piece by piece in the first passage 32 and after that they are illuminated by the light source 20, and then the sheets are fed through the second passage 33 and out of the apparatus. Both the first passage 32 and the second passage 33 can be opened to the outside by opening the telephone placing portion 12.

In addition at an upper surface of the rearward portion of the facsimile apparatus, there is provided with a outlet opening 30 for putting out both original sheets and recording papers. The cassette 17 for installing a recording roll paper is attached at a rearward side portion of the housing 10 of the facsimile apparatus, thereby the facsimile apparatus can keep a small thickness and a plane configuration.

Figure 3A:
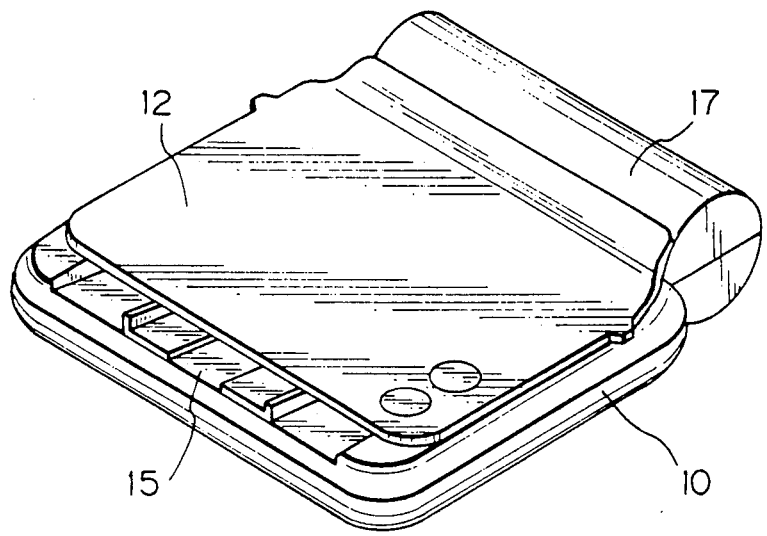
FIG. 3a shows a perspective view of the facsimile apparatus when a telephone placing portion is closed.
Figure 3B:
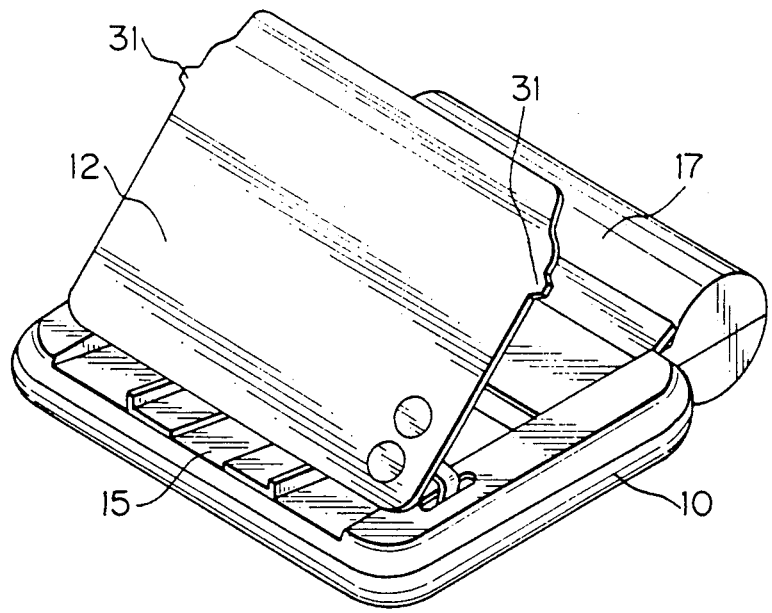
FIG. 3b shows a perspective view of the facsimile apparatus when a telephone placing portion is opened.

FIG. 3a shows the facsimile apparatus when the telephone placing portion 12 is closed, and FIG. 3b shows the apparatus when the placing portion is opened. Usually it is closed as shown in FIG. 3a, however, for example, when sheet clogging or the like takes place, it is opened so as to remove the sheets out of the facsimile apparatus. By means of lifting a pair of projecting portions 31 formed at both sides of the telephone placing portion 12, the telephone placing portion 12 is opened and the first and second passage is opened to the outside (see FIG. 2). Thereby the sheets clogged in the passage can be removed.

Many widely different embodiments of the present invention may be constructed without departing from the spirit and the scope of the present invention. It should be understood that the present invention is not limited to the specific embodiments described in the specification, except as defined in the appended claims.

What is claimed is:

1. A facsimile apparatus using a public telephone network comprising:

a housing for said apparatus:

a telephone placing portion, on which a telephone connected to said public telephone network can be placed during the operation of said apparatus, formed as an upper part of said housing, and having a plane surface and including a guide portion for guiding an original inserted into said apparatus;

means for scanning the original by feeding said original to generate electrical signals representing image information of said original;

means for recording image information applied to said apparatus via the public telephone network on a sheet, both of said scanning means and said recording means being disposed side by side along the direction of feeding of said original;

a first passage disposed between said telephone placing portion and said scanning means, through which said original is fed; and a second passage disposed between said telephone placing portion and said recording means, through which said original passing through said first passage is fed.

2. A facsimile apparatus according to claim 1, wherein said telephone placing portion is capable of being kept in a closed position during the operation of said apparatus and being opened when sheet jams take place.

3. A facsimile apparatus according to claim 1, wherein said telephone placing portion includes a first switch for starting the operation of said scanning means and a second switch for stopping the operation of said scanning means and said recording means.

4. A facsimile apparatus according to claim 1, wherein said telephone placing portion is disposed above both said scanning means and said recording means to cover the upper portion of both said scanning means and said recording means.

5. A facsimile apparatus according to claim 1, wherein both said first passage and said second passage can be exposed to the outside by opening said telephone placing portion.

6. A facsimile apparatus according to claim 1, wherein said housing comprises an outlet opening used for putting out both the recorded sheet from said recording means and the original from said scanning means.

7. A facsimile apparatus according to claim 6, wherein said outlet opening is surrounded by at least one side edge of said telephone placing portion.

8. A facsimile apparatus according to claim 7, wherein said apparatus further comprises an inlet opening surrounded by at least another side edge of said telephone placing portion opposite to said one side edge, wherein an original is inserted into said apparatus through said inlet opening.

9. A facsimile apparatus according to claim 8, wherein said scanning means comprises a roller which abuts said guide portion for feeding an original passing through said inlet opening, said original being passed between said roller and said guide portion.

10. A facsimile apparatus according to claim 1, wherein said apparatus further comprises a sheet cassette for supplying sheet used to record image information thereon.

11. A facsimile apparatus according to claim 1, wherein said scanning means includes a light source for illuminating said original, an optical system for guiding light reflected from said original, and a CCD line sensor for sensing said light.

12. A facsimile apparatus according to claim 1, wherein said recording means includes a platen roller for feeding said sheet on which image information is recorded and a thermal recording head supported by said platen roller.

13. A facsimile apparatus according to claim 1, wherein said recording means is also capable of recording the image information from said scanning means on a sheet.

14. A facsimile apparatus according to claim 13, wherein said telephone placing portion includes a first switch for starting the operation of said scanning means and a second switch for stopping the operation of said scanning means and said recording means.

* * * * *